United States Patent
Bais et al.

(10) Patent No.: US 12,070,153 B2
(45) Date of Patent: Aug. 27, 2024

(54) BEVERAGE MAKER AND METHOD FOR DETERMINING HOT WATER AMOUNTS OUTPUT BY A BEVERAGE MAKER AND/OR USED IN SAME FOR BEVERAGE PREPARATION

(71) Applicant: WMF GmbH, Geislingen an der Steige (DE)

(72) Inventors: Johannes Bais, Ulm (DE); Philipp Schirrmacher, Ulm (DE); Armin Startz, Weidenstetten (DE)

(73) Assignee: WMF GmbH (DE)

( * ) Notice: Subject to any disclaimer, the term of this patent is extended or adjusted under 35 U.S.C. 154(b) by 510 days.

(21) Appl. No.: 16/754,308

(22) PCT Filed: Sep. 21, 2018

(86) PCT No.: PCT/EP2018/075573
§ 371 (c)(1),
(2) Date: Apr. 7, 2020

(87) PCT Pub. No.: WO2019/072519
PCT Pub. Date: Apr. 18, 2019

(65) Prior Publication Data
US 2020/0305636 A1    Oct. 1, 2020

(30) Foreign Application Priority Data
Oct. 9, 2017   (DE) .................... 10 2017 217 953.8

(51) Int. Cl.
*A47J 31/46* (2006.01)
*A47J 31/00* (2006.01)
(Continued)

(52) U.S. Cl.
CPC ............ *A47J 31/469* (2018.08); *A47J 31/002* (2013.01); *A47J 31/007* (2013.01); *A47J 31/30* (2013.01);
(Continued)

(58) Field of Classification Search
CPC ...... A47J 31/469; A47J 31/002; A47J 31/007; A47J 31/30; A47J 31/3671; A47J 31/402;
(Continued)

(56) References Cited

U.S. PATENT DOCUMENTS 6,446,834 B2 * 9/2002 Davis ................... B67D 1/0855
                                                    137/100
6,845,704 B2 * 1/2005 Lassota ................. A47J 31/402
                                                     99/280
(Continued)

FOREIGN PATENT DOCUMENTS

DE         4409030 A1 *  1/1995  ............... A23F 5/26
DE     102010047888 A1    4/2012
(Continued)

OTHER PUBLICATIONS

Machine English Translation of DE-4409030-A1 (Year: 1995).*
International Search Report for Application No. PCT/EP2018/075573, mailed Nov. 19, 2018, pp. 1-3.

*Primary Examiner* — Janie M Loeppke
*Assistant Examiner* — Erwin J Wunderlich
(74) *Attorney, Agent, or Firm* — Lerner David LLP

(57) ABSTRACT

A beverage maker includes a heating device for heating water, a cold water inflow, a first hot water outlet, at least one second hot water outlet, a cold water path connecting the cold water inflow to the heating device, a first hot water path connecting the heating device to the first hot water outlet, at least one second hot water path connecting the heating device to the at least one second hot water outlet, a conveying device for conveying water, a first flow meter that is
(Continued)

arranged in the cold water path or in the first hot water path, and at least one second flow meter that is arranged in the at least one second hot water path. A method of determining hot water amounts dispensed by a beverage maker and/or hot water amounts used for beverage preparation is also disclosed.

8 Claims, 3 Drawing Sheets

(51) Int. Cl.
*A47J 31/30* (2006.01)
*A47J 31/36* (2006.01)
*A47J 31/40* (2006.01)
*A47J 31/41* (2006.01)
*A47J 31/44* (2006.01)
*A47J 31/52* (2006.01)
*A47J 31/54* (2006.01)
*A47J 31/56* (2006.01)
*B67D 1/12* (2006.01)

(52) U.S. Cl.
CPC ......... *A47J 31/3671* (2013.01); *A47J 31/402* (2013.01); *A47J 31/41* (2013.01); *A47J 31/44* (2013.01); *A47J 31/467* (2013.01); *A47J 31/5255* (2018.08); *A47J 31/56* (2013.01); *B67D 1/12* (2013.01); *A47J 31/545* (2013.01)

(58) Field of Classification Search
CPC ...... A47J 31/41; A47J 31/467; A47J 31/5255; A47J 31/56; A47J 31/545; A47J 31/44; A47J 31/02; A47J 31/4482; A47J 31/60; A47J 31/4485; A47J 31/061; A47J 45/10; A47J 36/10; B67D 1/12; F24D 2220/044
USPC ......... 99/275, 280, 281, 288, 290, 295, 323, 99/279, 293
See application file for complete search history.

(56) References Cited

U.S. PATENT DOCUMENTS

| | | | |
|---|---|---|---|
| 8,250,933 B2* | 8/2012 | Banas | F24H 15/238 73/861.61 |
| 8,424,725 B2* | 4/2013 | Boyer | B67D 1/1279 222/134 |
| 9,821,992 B2* | 11/2017 | Rudick | B67D 1/07 |
| 2005/0188854 A1* | 9/2005 | Green | A47J 31/3642 99/275 |
| 2006/0249030 A1* | 11/2006 | Bienvenu | A47J 31/3676 99/291 |
| 2010/0218684 A1* | 9/2010 | Etter | A47J 31/407 174/254 |
| 2012/0164285 A1* | 6/2012 | Doglioni Major | A47J 31/5255 99/302 R |
| 2014/0069279 A1* | 3/2014 | Upston | A47J 31/44 99/283 |
| 2015/0208851 A1* | 7/2015 | Grassia | A47J 31/002 99/283 |
| 2015/0272382 A1* | 10/2015 | Truninger | A47J 31/4403 99/290 |
| 2016/0095465 A1* | 4/2016 | Ait Bouziad | F04B 19/24 99/302 R |
| 2016/0287010 A1 | 10/2016 | Doglioni Majer | |
| 2017/0052550 A1* | 2/2017 | Akita | G05D 23/1393 |
| 2018/0317694 A1* | 11/2018 | Rognon | A47J 31/5253 |
| 2021/0186258 A1* | 6/2021 | Buchholz | A47J 31/5253 |
| 2021/0378438 A1* | 12/2021 | Dünki | A47J 31/407 |

FOREIGN PATENT DOCUMENTS

| | | | | |
|---|---|---|---|---|
| EP | 1354543 | A1 * | 10/2003 | ...... A47J 31/46 |
| EP | 1893063 | A1 | 3/2008 | |
| EP | 2526841 | A1 | 11/2012 | |
| EP | 2612577 | A1 | 7/2013 | |
| EP | 2489290 | B1 | 12/2014 | |
| EP | 2954811 | A1 | 12/2015 | |
| JP | H11105989 | A | 4/1999 | |
| JP | 2002367070 | A | 12/2002 | |
| JP | 2008541262 | A | 11/2008 | |
| JP | 2012222887 | A | 11/2012 | |
| JP | 2016522039 | A | 7/2016 | |
| JP | 2016217551 | A | 12/2016 | |
| JP | 2016539684 | A | 12/2016 | |
| WO | 2006121514 | A1 | 11/2006 | |
| WO | 2011151703 | A2 | 12/2011 | |

* cited by examiner

BEVERAGE MAKER AND METHOD FOR DETERMINING HOT WATER AMOUNTS OUTPUT BY A BEVERAGE MAKER AND/OR USED IN SAME FOR BEVERAGE PREPARATION

CROSS-REFERENCE TO RELATED APPLICATIONS

The present application is a national phase entry under 35 U.S.C. § 371 of International Application No. PCT/EP2018/075573 filed Sep. 21, 2018, which claims priority from German Application No. 10 2017 217 953.8 filed Oct. 9, 2017, all of which are hereby incorporated herein by reference.

BACKGROUND OF THE INVENTION

The present invention relates to a beverage maker that comprises a heating device for heating water, a cold water inflow, a first hot water outlet, at least one second hot water outlet, a cold water path connecting the cold water inflow to the heating device, a first hot water path connecting the heating device to the first hot water outlet, at least one second hot water path connecting the heating device to the at least one second hot water outlet, a conveying device for conveying water, a first flow meter that is arranged in the cold water path or in the first hot water path, and at least one second flow meter that is arranged in the at least one second hot water path. In this respect, each of the second hot water outlets is connected to the heating device via a respective one of the second hot water paths and a respective one of the second flow meters is arranged in each of the second hot water paths. The simultaneous or time-delayed dispensing or preparation of two or more hot beverages is made possible with high metering precision using the beverage maker in accordance with the invention. The present invention additionally relates to a method of determining hot water amounts dispensed by a beverage maker and/or hot water amounts used in same for beverage preparation.

Hot water having a predetermined temperature and amount is required in hot beverage vending machines for brewing coffee. The water is provided by connection to the domestic water supply or by a water tank and is heated to the required temperature by a heating unit. A pump conveys the brewing water to the brewing unit and pumps it through the ground coffee at the required pressure and in the required amount. These coffee machines can as a rule also dispense further hot beverages such as tea water and hot chocolate in addition to coffee. These dispensing operations of the beverages should also take place simultaneously as much as possible for reasons of efficiency. This means that while a cup of coffee is being brewed, the drawing of tea water and/or hot chocolate should also be possible.

In coffee machines, boilers, continuous-flow water heaters, or heat exchangers are e.g. used for generating hot water. Vane pumps or magnetic piston pumps are, for example, used for the conveying and the pressure generation.

The following two possibilities are available for the amount metering in accordance with the current prior art.

Variant 1

The hot water or brewing water is metered over time, with it being assumed that the pump has constant conveying amount. This is the least expensive solution. However, fluctuations in the amount ground, in the coarseness setting, and in the pressing also produce considerable fluctuations in the dispensed amount in the cup.

Variant 2

A measuring device for determining the flow amount is located before or after the pump in the cold water path here. Since an equal amount of cold water is always refilled simultaneously with the amount of hot water removed in the known hot water systems, said equal amount corresponds to the brewing water amount used. These flow meters are volume meters in which the water is conducted through a measuring device having an impeller wheel. The revolutions of the vanes are detected by magnets and a magnetic field sensor and thus the flow amount per time is determined. A coffee brewing is now carried out for so long until the amount of water required for this was measured at the flow meter. The metering accuracy is improved with respect to the first variant by use of a flow meter. An obtaining of two products is only possible with restrictions in that a time control is used for the dispensing for the second product and in that it is assumed in this process that a constant flow takes place due to the pump conveying power, the line cross-sections, and the line lengths. As a further solution, two different heater points can be used and for this purpose, arranged upstream in each case, a flow meter in the cold water region. High accuracy is thus achieved, but also a considerably greater number of parts is installed in such systems.

A beverage maker in accordance with the prior art having a hot water producer, a pump, and a flow meter can be seen, for example, from EP 2 489 290 B 1.

The described prior art, however, has substantial disadvantages. A simultaneous obtaining of two products from a heater system with a time control is thus not possible. With the described flow meter control, a simultaneous obtaining of two products is only possible with great metering fluctuations since only the consumed total amount of water is detected. A simultaneous or time-delayed dispensing or preparation of two or more hot beverages is thus only possible, if at all, using the devices in accordance with the previous prior art while accepting large metering fluctuations and thus a very small metering accuracy.

BRIEF SUMMARY OF THE INVENTION

Aspects of the present invention may provide a beverage maker that enables the simultaneous or time-delayed dispensing of two or more hot beverages with very high metering accuracy.

A beverage maker is thus set forth in accordance with an embodiment of the invention that comprises a heating device for heating water, a cold water inflow, a first hot water outlet, at least one second hot water outlet, a cold water path connecting the cold water inflow to the heating device, a first hot water path connecting the heating device to the first hot water outlet, at least one second hot water path connecting the heating device to the at least one second hot water outlet and a conveying device for conveying water. In accordance with the invention, the beverage maker comprises a first flow meter that is arranged in the cold water path or in the first hot water path, and at least one second flow meter that is arranged in the at least one second hot water path.

In accordance with an embodiment of the invention, each second hot water outlet, i.e. each of the second hot water outlets, is connected to the heating device by a respective second hot water path, i.e. by a respective one of the second hot water paths. This means that when the beverage maker in accordance with the invention comprises a second hot water outlet and a second hot water path, the second hot water outlet is connected to the heating device by the second hot water path or, when the beverage maker in accordance with the invention comprises a plurality of second hot water outlets and a plurality of second hot water paths, each of the second hot water outlets is connected to the heating device by a respective one of the second hot water paths.

In accordance with the invention, a respective second flow meter, i.e. a respective one of the second flow meters, is arranged in each second hot water path, i.e. in each of the second hot water paths. This means that when the beverage maker in accordance with the invention comprises a second hot water path and a second flow meter, the second flow meter is arranged in the second hot water path or, when the beverage maker in accordance with the invention comprises a plurality of second hot water paths and a plurality of second flow meters, a respective one of the second flow meters is arranged in each of the second hot water paths.

The device in accordance with the invention thus comprises one or more second hot water outlets, one or more second hot water paths, and one or more second flow meters. The device can, for example, comprise exactly one second hot water outlet, exactly one second hot water path, and exactly one second flow meter. In this case, the second hot water outlet is connected to the heating device by the second hot water path, with the second flow meter being arranged in the second hot water path. The device can, however, also contain a plurality of second hot water outlets, a plurality of second hot water paths, and a plurality of second flow meters. In this case, each of the second hot water outlets is connected to the heating device via a respective one of the second hot water paths, with a respective one of the second flow meters being arranged in each of the second hot water paths. The device can, for example, comprise two second hot water outlets, two second hot water paths, and two second flow meters. In this case, each of the second hot water outlets is connected to the heating device via a respective one of the two second hot water paths, with a respective one of the two second flow meters being arranged in each of the two second hot water paths.

The beverage maker in accordance with the invention is in particular characterized in that at least two flow meters are contained therein. A flow meter, namely the first flow meter, is here in the cold water path or in the first hot water path. At least one further flow meter, namely the at least one second flow meter, is in the at least one second hot water path.

The amount of water flowing through the at least one second hot water path can be directly measured by the at least one second flow meter arranged in the at least one second hot water path. In this manner, the exact metering of a hot water amount dispensed by the at least one second hot water outlet or used for beverage preparation at the at least one second hot water outlet is made possible at all times.

If the first flow meter is arranged in the first hot water path, the amount of water flowing through the first hot water path can also be directly measured by the first flow meter here.

A high metering accuracy in the hot water amounts dispensed or used or in the beverages dispensed can thus be achieved by the use of a flow meter in the first hot water path and at least one second flow meter in the at least one second hot water path, even with a simultaneous or time-delayed dispensing or preparation of two hot beverages.

If the first flow meter is now arranged in the cold water path, the amount of water flowing through the cold water path can first be measured by it. If now only one hot water amount is dispensed by the first hot water path without a second hot water amount being dispensed simultaneously or with a time delay by the at least one second hot water path, the amount of water flowing through the cold water path corresponds to the amount of water flowing through the first hot water path so that the determination of the amount of water flowing through the first hot water path can be easily determined by the first flow meter and thus an exact metering of a hot water amount dispensed by the first hot water outlet or at the at least first hot water outlet for beverage preparation is made possible. If now instead two hot water amounts are dispensed simultaneously or with a time delay, i.e. a first hot water amount by the first hot water path and, simultaneously or with a time delay, a second hot water amount by the at least one second hot water path, an exact determination of the water amount flowing through the first hot water path is also possible here in that the amount of water flowing through the at least one second hot water path determined by the at least one second flow meter is deducted from the amount of water flowing through the cold water path measured by the first flow meter. The fact is utilized here that the amount of water flowing through the cold water path ultimately corresponds to the sum of the amounts of water flowing through the hot water paths. In other words, since the first flow meter in the cold water path detects the total amount of the water dispensed, the dispensed amount at the first hot water outlet can also be detected by a difference formation of the measurement results of the first flow meter and of the at least second flow meter and can thus also be metered accordingly.

A high metering precision in the hot water amounts dispensed or used or in the dispensed beverages is thus also made possible for the case that the first flow meter is arranged in the cold water path, irrespective of whether and how many hot water amounts are dispensed by the hot water outlets or are used at them for beverage preparation simultaneously or with a time delay.

The simultaneous or time-delayed dispensing of two or more hot beverages by a beverage maker is thus made possible with high metering accuracy by the use in accordance with the invention of at least two flow meters. Due to the use of at least two flow meters, the dispensed amounts can either be directly measured or can be determined by a simple difference formation (and optionally an additional sum formation) of water amounts directly measured by the flow meters. The dispensed amounts of the beverage maker can in this manner also be determined very exactly with a simultaneous dispensing of a plurality of beverages. An improvement in the metering accuracy of the beverages dispensed by the beverage maker can thus ultimately be achieved.

The advantage results from this that the correct beverage amounts can be dispensed and that the correct hot water amounts can be used for the beverage preparation at all times, which has the result that the beverages can be prepared and dispensed correctly at all times, even when a plurality of beverages are prepared or dispensed simultaneously.

There is furthermore also the possibility, if no product is obtained, to implement a leak monitoring and, on a recognition of a leak, to associate this leak with a specific water path. It is thus also possible with the beverage maker in accordance with the invention to recognize and localize a leaking point, i.e. to determine the water path where it is located.

A preferred embodiment of the beverage maker in accordance with the invention is characterized in that at least one of the flow meters arranged in a hot water path, preferably every flow meter arranged in a hot water path, is a contactless flow meter, preferably an ultrasound flow meter or a magnetically inductive flow meter. Both the first flow meter and the at least one second flow meter can be a contactless flow meter, preferably an ultrasound flow meter or a magnetically inductive flow meter.

On the heating of the water in the heating device, lime that can be released by heating and cooling can form in the course of the operating time. The lime particles and lime chips created in this process are flushed into the hot water paths and can there block the rotating impeller wheel of a flow meter located there, which can result in a complete failure of the beverage maker. Such a blocking can be avoided by a use of a contactless flow meter since the latter has no rotating impeller wheel or corresponding moving element which could block. As a result thereof, lime and lime chips have no influence or at least only a small influence on the volume flow detection by the flow meters. In addition, possible failure of the beverage maker can be prevented.

It is naturally also possible that a flow meter arranged in the cold water path is a contactless flow meter, preferably an ultrasound flow meter or a magnetically inductive flow meter.

The conveying device for conveying water can be a pump.

In a further preferred embodiment, the conveying device for conveying water is arranged in the cold water bath.

The first flow meter is preferably arranged in the cold water path upstream of the conveying device for conveying water or downstream of the conveying device for conveying water.

A further preferred embodiment is characterized in that the beverage maker has a respective brewing unit for brewing coffee or a mixing unit for mixing water with a solid, preferably cocoa powder or soup powder, at the first hot water outlet and/or at the at least one second hot water outlet. If a brewing unit for brewing coffee is located at a hot water outlet, the water flowing through this hot water outlet can be used in the brewing unit together with coffee powder for the preparation of coffee that can subsequently be dispensed by the beverage maker. If a mixing unit for mixing water with a solid, e.g. cocoa powder or soup powder, is located at a hot water outlet, the water flowing through this hot water outlet can be used in the mixing unit together with coffee powder for the preparation of a mixed beverage, e.g. of cocoa or drinking soup, that can subsequently be dispensed by the beverage maker.

Various combinations are possible with the just described preferred embodiment. The beverage maker can thus, for example, have a brewing unit for brewing coffee at one hot water outlet and a mixing unit for mixing water with a solid, e.g. cocoa powder or soup powder, at another hot water outlet. The beverage maker can, however, also have a respective brewing unit for brewing coffee at two hot water outlets. Or the beverage maker can have a brewing unit for brewing coffee at one hot water outlet and a respective mixing unit for mixing water with a solid at two other hot water outlets. In principle, various combinations and options are therefore conceivable that can be used in the beverage maker in accordance with the invention.

If neither a brewing unit nor a mixing unit is located at a hot water outlet, the hot water flowing through this hot water outlet can be dispensed directly from the beverage maker. This hot water can then be used e.g. for the preparation of tea outside the beverage maker. The beverage maker can, for example, have neither a brewing unit nor a mixing unit at the first hot water outlet.

It is particularly preferred that the beverage maker has a brewing unit for brewing coffee at one of the second water outlets, a mixing unit for mixing water with a solid, e.g. cocoa powder or soup powder, at a further one of the second hot water outlets, and neither a brewing unit nor a mixing unit at the first hot water outlet.

A further embodiment of the beverage maker in accordance with the invention is characterized in that the beverage maker comprises one, i.e. exactly one, second hot water outlet, one, i.e. exactly one, second hot water path, and one, i.e. exactly one, second flow meter; or a plurality of second hot water outlets, preferably two or three second hot water outlets, a plurality of second hot water paths, preferably two or three hot water paths, and a plurality of second flow meters, preferably two or three flow meters.

The flow meter in accordance with the invention preferably respectively comprises the same number of second hot water outlets, second hot water paths, and second flow meters. This means that the number of second hot water outlets comprised by the beverage maker corresponds both to the number of second hot water paths comprised by the beverage maker and to the number of second flow meters comprised by the beverage maker.

If the beverage maker comprises exactly one second hot water outlet, exactly one second hot water path, and exactly one second flow meter, the second hot water outlet is then connected to the heating device by the second hot water path, with the second flow meter being arranged in the second hot water path. In this case, the amount of water flowing through the second hot water path can be directly measured by the flow meter arranged in the second hot water path. If the first flow meter is arranged in the first hot water path, the amount of water flowing through the first hot water path can also be directly measured by the first flow meter here. If the first flow meter is now arranged in the cold water path, the amount of water flowing through the first hot water path can be determined in that the difference is formed from the amount of water flowing through the cold water path measured by the first flow meter and the amount of water flowing through the second hot water path measured by the second flow meter. A high metering accuracy in the hot water amounts dispensed or used or in the beverages dispensed can thus be achieved by the use two flow meters, even with a simultaneous or time-delayed dispensing or preparation of two hot beverages.

If the device comprises a plurality of second hot water outlets, a plurality of second hot water paths, and a plurality of second flow meters, each of the second hot water outlets is then connected to the heating device via a respective one of the second hot water paths, with a respective one of the second flow meters being arranged in each of the second hot water paths. In this case, the respective amount of water flowing through the second hot water paths can be directly measured by the flow meters arranged in the second hot water paths. In other words, each of the second hot water paths respectively contains a flow meter by which the amount of water flowing through the respective hot water path can be measured. If the first flow meter is arranged in the first hot water path, the amount of water flowing through the first hot water path can also be directly measured by the first flow meter here. If the first flow meter is now arranged in the cold water path, the amount of water flowing through the first hot water path can be determined in that the difference is formed from the amount of water flowing through the cold water path measured by the first flow meter and the sum of amounts of water flowing through the second hot water paths measured by the second flow meters. In other words, the individual amounts of water flowing through the plurality of hot water paths are first measured by the plurality of second flow meters. These amounts are summed to one sum. This sum is subsequently deducted from the amount of water flowing through the cold water path measured by the flow meter arranged in the cold water path. The result corresponds to the amount of water flowing through the first hot water path. A high metering accuracy in the hot water amounts dispensed or used or in the beverages dispensed can thus be achieved by the use of more than two flow meters, even with a simultaneous or time-delayed dispensing or preparation of more than two hot beverages.

The device can, for example, comprise three second hot water outlets, three second hot water paths, and three second flow meters. In this case, each of the three second hot water outlets is connected to the heating device via a respective one of the three hot water paths, with a respective one of the three flow meters being arranged in each of the three hot water paths.

A further preferred embodiment is characterized in that the beverage maker is a beverage vending machine for dispensing a plurality of hot beverages and/or cold beverages comprising one or more specialty coffees, one or more specialty teas, and/or one or more specialty drinking soups.

The present invention also relates to a method of determining hot water amounts dispensed by a beverage maker and/or used in same for beverage preparation, wherein the beverage maker is a beverage maker in accordance with the invention, and wherein at least one hot water amount dispensed by one of the hot water outlets and/or used at one of the hot water outlets for beverage preparation is determined.

A preferred variant of the method in accordance with the invention is characterized in that two hot water amounts that are dispensed simultaneously, at least at times by a respective one of the hot water outlets and/or that are used simultaneously, at least at times at a respective one of the hot water outlets for beverage preparation are determined.

In a further preferred variant of the method in accordance with the invention, a hot water amount dispensed by the at least one second hot water outlet or used at the at least one second hot water outlet for beverage preparation is determined in that the amount of water flowing through the at least one second hot water path is measured by the at least one second flow meter.

A further preferred variant of the method in accordance with the invention is characterized in that the first flow meter is arranged in the cold water path and a hot water amount dispensed by the first hot water outlet or used at the first hot water outlet for beverage preparation is determined in that the amount of water flowing through the cold water path is measured by the first flow meter, the amount of water flowing through the at least one second hot water path is determined by the at least one second flow meter, and the amount of water flowing through the first hot water path is determined by forming the difference from the amount of water flowing through the cold water path measured by the first flow meter and the amount of water flowing through the at least one second hot water path determined by the at least one second flow meter.

It is possible in this preferred variant that the beverage maker comprises one, i.e. exactly one, second hot water outlet, one, i.e. exactly one, second hot water path, and one, i.e. exactly one, second flow meter, wherein a hot water amount dispensed by the first hot water outlet or used at the first hot water outlet for beverage preparation is determined in that the amount of water flowing through the cold water path is measured by the first flow meter, the amount of water flowing through the second hot water path is determined by the second flow meter, and the amount of water flowing through the first hot water path is determined by forming the difference from the amount of water flowing through the cold water path measured by the first flow meter and the amount of water flowing through the second hot water path determined by the second flow meter.

It is, however, also possible that the beverage maker has a plurality of second hot water outlets, a plurality of second hot water paths, and a plurality of second flow meters, wherein a hot water amount dispensed by the first hot water outlet or used at the first hot water outlet for beverage preparation is determined in that the amount of water flowing through the cold water path is measured by the first flow meter, the amounts of water flowing through the second hot water paths are determined by the second flow meters, and the amount of water flowing through the first hot water path is determined by forming the difference from the amount of water flowing through the cold water path measured by the first flow meter and the sum of the amounts of water flowing through the second hot water paths measured by the second flow meters.

In a further preferred variant of the method in accordance with the invention, the first flow meter is arranged in the first hot water path and a hot water amount dispensed by the first hot water outlet or used at the first hot water outlet for beverage preparation is determined in that the amount of water flowing through the first hot water path is measured by the first flow meter.

A further preferred variant of the method in accordance with the invention is characterized in that, if only one hot water amount is dispensed by the beverage maker and/or is used in same for beverage preparation, said hot water amount flowing through a second hot water path here, at least one of the flow meters is calibrated, wherein here a measurement value for the amount of water flowing through the cold water path is measured by the first flow meter, a measurement value for the amount of water flowing through this second hot water path is measured by the flow meter arranged in said second hot water path through which the hot water amount flows, and the two measurement values are subsequently compared with one another.

This preferred method variant utilizes the serial connection of the flow meter arranged in the cold water path and of a flow meter arranged in a hot water path to thus achieve a calibration of one of the flow meters. For the case that only a single beverage is obtained from the beverage maker, i.e. only a single beverage is dispensed or prepared by the beverage maker, and that this beverage flows through the second hot water path or one of the second hot water paths, the same water amount first flows through the cold water path and subsequently, after the heating of the water in the heating device, through the hot water path. The measurement value determined by the flow meter arranged in the cold water path should thus at least substantially correspond to the measurement value determined by the flow meter arranged in the hot water path. One of the two flow meters can therefore be compared with or calibrated by the other by a comparison of the two measurement values.

There is furthermore also the possibility, if no product is obtained, to implement a leak monitoring and, on a recognition of a leak, to associate this leak with a specific water path.

The present invention also relates to the use of a beverage maker in accordance with the invention for metering and/or dispensing beverages, preferably hot beverages, wherein two or more beverages are preferably metered and/or dispensed simultaneously or with a time delay.

BRIEF DESCRIPTION OF THE DRAWINGS

The present invention will be explained in more detail with reference to the following Figures and examples without restricting it to the specific embodiments and parameters shown here.

DETAILED DESCRIPTION

Figure 1:
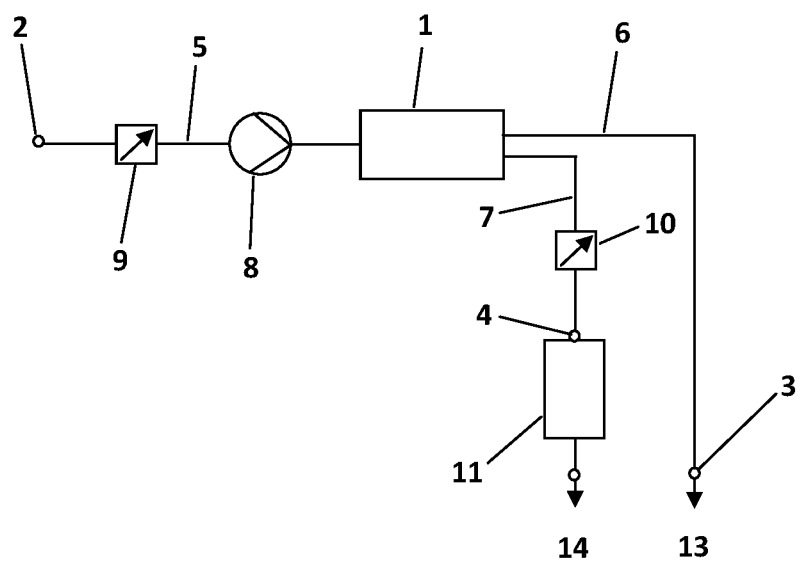
FIG. 1 is a schematic representation of the water progress of the beverage maker in accordance with an embodiment of the invention.

A schematic representation of the water progress of an exemplary embodiment of the beverage maker in accordance with an embodiment of the invention is shown in FIG. 1. The beverage maker here comprises a heating device 1 for heating water, a cold water inflow 2, a first hot water outlet 3, a second hot water outlet 4, a cold water path 5 connecting the cold water inflow 2 to the heating device 1, a first hot water path 6 connecting the heating device 1 to the first hot water outlet 3, a second hot water path 7 connecting the heating device 1 to the second hot water outlet 4, a conveying device 8 for conveying water, a first flow meter 9 that is arranged in the cold water path 5, and a second flow meter 10 that is arranged in the second hot water path 7.

The conveying device 8 for conveying water is a pump. The second flow meter 10 is a contactless flow meter, e.g. an ultrasound flow meter or a magnetically inductive flow meter. The conveying device 8 for conveying water is arranged in the cold water path 5, with the first flow meter 9 in the cold water path being arranged upstream of the conveying device 8 for conveying water. The beverage maker additionally has a brewing unit 11 for brewing coffee at the second hot water outlet 4.

Hot water 13 and coffee 14 can thus be obtained by the beverage maker whose water progress is shown schematically in FIG. 1. The hot water 13 is dispensed by the first hot water outlet 3. The coffee 14 is prepared in the brewing unit 11 and is subsequently dispensed by an outlet.

The amount of water flowing through the second hot water path 7 can be measured by the second flow meter 10 arranged in the second hot water path 7. In this manner, the exact metering of a hot water amount used at the second hot water outlet 4 for coffee preparation in the brewing unit 11 is made possible, whereby the amount of dispensed coffee can ultimately also be exactly metered.

If now only one hot water amount is conducted over the first hot water path 6 and is dispensed at the first hot water outlet 3, e.g. for the preparation of tea outside the beverage maker, without a second hot water amount flowing over the second hot water path 7 simultaneously or with a time delay, the amount of water flowing through the cold water path 5 corresponds to the amount of water flowing through the first hot water path 6 so that an exact metering is possible with the aid of the first flow meter 9 in that the amount of water flowing through the cold water path 5 is measured by it that then corresponds to the amount of water flowing through the first hot water path 6. The amount of dispensed hot water can thus be exactly metered.

If now two hot water amounts are dispensed simultaneously or with a time delay, i.e. a first hot water amount flows over the first hot water path 6 and, simultaneously or with a time delay, a second hot water amount flows over the second hot water path 7, an exact determination of the water amount flowing through the first hot water path 6 is also possible here in that the amount of water flowing through the second hot water path 7 determined by the second flow meter 10 is deducted from the amount of water flowing through the cold water path 5 measured by the first flow meter 9. The fact is utilized here that the amount of water flowing through the cold water path 5 ultimately corresponds to the sum of the amounts of water flowing through the hot water paths 6 and 7.

A high metering accuracy of the hot water amounts dispensed or used for beverage preparation or of the dispensed beverage amounts is thus made possible, even if two hot water amounts are dispensed or are used for beverage preparation simultaneously or with a time delay.

Figure 2:
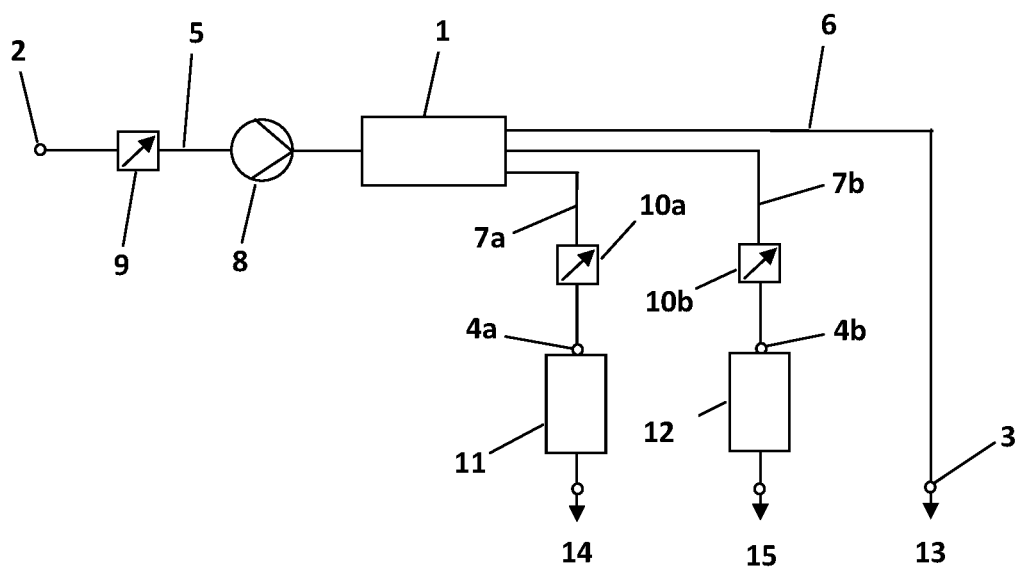
FIG. 2 is a schematic representation of the water progress of the beverage maker in accordance with another embodiment of the invention.

A schematic representation of the water progress of a further exemplary embodiment of the beverage maker in accordance with an embodiment of the invention is shown in FIG. 2. The design shown here substantially differs from the design shown in FIG. 1 in that the beverage maker comprises two second hot water outlets 4a and 4b, two second hot water paths 7a and 7b, and two second flow meters 10a and 10b. As can be seen from FIG. 2, each of the second hot water outlets 4a and 4b is connected to the heating device 1 by a respective one of the second hot water paths 7a and 7b. The second hot water outlet 4a is thus connected to the heating device 1 by the second hot water outlet 7a while the second hot water outlet 4b is connected to the heating device by the second hot water outlet 7b. It can additionally be seen from FIG. 2 that a respective one of the second flow meters 10a and 10b is arranged in each of the second hot water paths 7a and 7b. The second flow meter 10a is thus arranged in the second hot water path 7a while the second flow meter 10b is arranged in the second hot water path 7b. The beverage maker has a brewing unit 11 for brewing coffee at the second hot water outlet 4a, whereas it has a mixing unit 12 for mixing water with cocoa powder at the second hot water outlet 4b.

The design shown in FIG. 2 is otherwise identical to that in FIG. 1.

Hot water 13, coffee 14, and cocoa 15 can thus be obtained by the beverage maker whose water progress is shown schematically in FIG. 2. The hot water 13 is dispensed by the first hot water outlet 3. The coffee 14 is prepared in the brewing unit 11 and is subsequently dispensed by an outlet. The cocoa is prepared in the mixing unit 12 and is subsequently dispensed by a further outlet.

The respective amount of water flowing through the second hot water paths 7a and 7b can be directly measured by the flow meters 10a and 10b arranged in the second hot water paths 7a and 7b. In other words, each of the second hot water paths 7a and 7b respectively contains a flow meter 10a or 10b by which the amount of water flowing through the respective hot water path 7a and 7b can be measured. In this manner, both the exact metering of a hot water amount used at the second hot water outlet 4a for coffee preparation in the brewing unit 11 and the exact metering of a hot water amount used at the second hot water outlet 4b for cocoa preparation in the mixing unit 12 are made possible.

The amount of water flowing through the first hot water path 6 can be determined in that the difference is formed from the amount of water flowing through the cold water path 5 measured by the first flow meter 9 and the sum of the amounts of water flowing through the second hot water paths 7a and 7b measured by the second flow meters 10a and 10b. In other words, the individual amounts of water flowing through the two second hot water paths 7a and 7b are first measured by the two second flow meters 10a and 10b. These amounts are then summed to one sum. This sum is subsequently deducted from the amount of water flowing through the cold water path 5 measured by the flow meter 9 arranged in the cold water path 5. The result corresponds to the amount of water flowing through the first hot water path 6.

A high metering accuracy with all hot water amounts dispensed or used for beverage preparation or all dispensed beverages can thus be achieved by the use of three flow meters, even with a simultaneous or time-delayed dispensing or preparation of two or three hot water amounts or hot beverages, such as here hot water, coffee, and cocoa.

The principle of the embodiment shown in FIG. 2 can also be easily modified in the sense of the present invention in that the beverage maker comprises more than two second hot water outlets, that is, for example, three, four, five, or also even more second hot water outlets. A high metering accuracy with all hot water amounts dispensed or used for beverage preparation or dispensed beverages can also be achieved in this case in accordance with the same principle with a simultaneous or time-delayed dispensing or preparation of two, three, or more hot water amounts or hot beverages.

Figure 3:
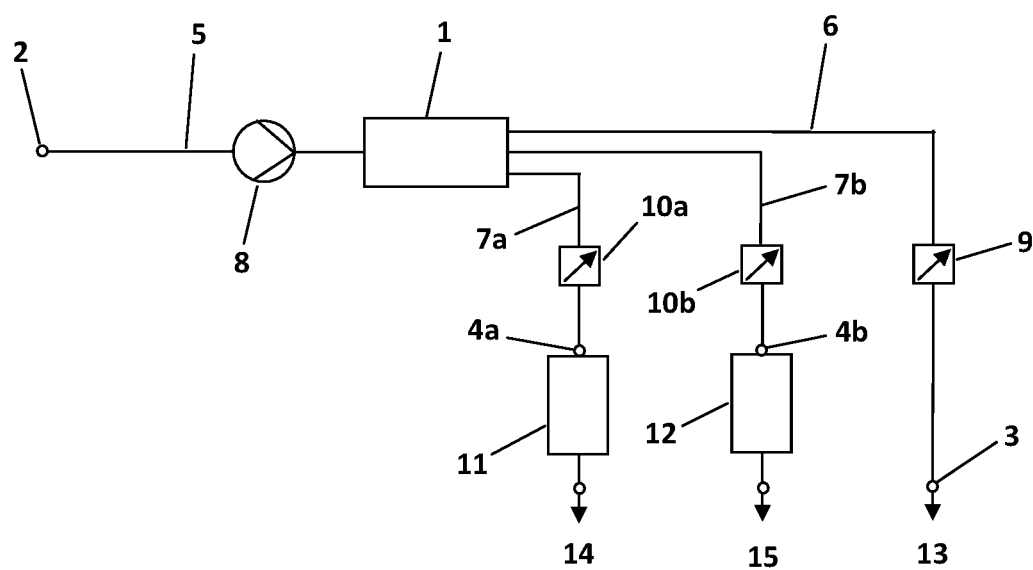
FIG. 3 is a schematic representation of the water progress of the beverage maker in accordance with a further embodiment of the invention.

A schematic representation of the water progress of a further exemplary embodiment of the beverage maker in accordance with an embodiment of the invention is shown in FIG. 3. The design shown here only differs from the design shown in FIG. 2 in that the first flow meter 9 is not arranged in the cold water path 5, but instead in the first hot water path 6. The design shown in FIG. 3 is otherwise identical to that in FIG. 2.

The respective amount of water flowing through the second hot water paths 7a and 7b can be directly measured by the flow meters 10a and 10b arranged in the second hot water paths 7a and 7b exactly as in the embodiment shown in FIG. 2.

In accordance with the same principle, the amount of water flowing through the first hot water path 6 can be directly measured by the flow meter 9 arranged in the first hot water path 6.

A high metering accuracy with all hot water amounts dispensed or used for beverage preparation or all dispensed beverages can thus be achieved by the use of three flow meters, even with a simultaneous or time-delayed dispensing or preparation of two or three hot water amounts or hot beverages, such as here hot water, coffee, and cocoa.

The invention claimed is:

1. A beverage maker for simultaneous dispensing of two or more hot beverages, comprising
   a heating device for heating water,
   a cold water inflow,
   a first hot water outlet,
   at least one second hot water outlet,
   a cold water path connecting the cold water inflow to the heating device,
   a first hot water path connecting the heating device to the first hot water outlet,
   at least one second hot water path connecting the heating device to the at least one second hot water outlet, with each of the at least one second hot water outlet connected to the heating device by a respective one of the at least one second hot water path,
   a conveying device for conveying water,
   a first flow meter arranged in the cold water path upstream of the conveying device for conveying water or downstream of the conveying device for conveying water, and
   at least one second flow meter arranged in the at least one second hot water path, wherein each of the at least one second flow meter is arranged in a respective one of the at least one second hot water path,
   wherein the at least one second flow meter arranged in the at least one second hot water path is a contactless flow meters,
   wherein the beverage maker is configured to determine an amount of water flowing through the cold water path, which corresponds to a sum of amounts of water flowing through all of the first hot water path and the at least one second hot water path,
   wherein the beverage maker has a brewing unit for brewing coffee at the at least one second hot water outlet,
   wherein the beverage maker is configured to
   determine at least one hot water amount used at the first hot water outlet for beverage preparation via measuring the amount of water flowing through the cold water path by the first flow meter, and
   i) determine the amount of water flowing through the at least one second hot water path by the at least one second flow meter, and
   determine the amount of water flowing through the first hot water path by calculating a difference between the amount of water flowing through the cold water path measured by the first flow meter and the amount of water flowing through the at least one second hot water path measured by the at least one second flow meter; or
   ii) determine the amounts of water flowing through the at least one second hot water path and flowing through further second hot water paths by the at least one second flow meter and by further second flow meters, and
   determine the amount of water flowing through the first hot water path by calculating a difference between the amount of water flowing through the cold water path measured by the first flow meter and the sum of the amounts of water flowing through the at least one second hot water path and flowing through the further second hot water paths measured by the at least one second flow meter and by the further second flow meters.

2. The beverage maker of claim 1, wherein the contactless flow meters are ultrasound flow meters or magnetically inductive flow meters.

3. The beverage maker of claim 1, wherein the conveying device for conveying water is arranged in the cold water path.

4. The beverage maker of claim 1, wherein the beverage maker includes a mixing unit for mixing water with a solid at a further at least one second hot water outlet.

5. The beverage maker of claim 1, wherein the at least one second hot water outlet is a plurality of second hot water outlets, the at least one second hot water path is a plurality of second hot water paths, and the at least one second flow meter is a plurality of second flow meters.

6. A method of determining hot water amounts used in the beverage maker for beverage preparation, wherein the beverage maker is the beverage maker in accordance with claim 1; and wherein at least one hot water amount used at the hot water outlets for beverage preparation is determined,
   wherein the at least one hot water amount used at the first hot water outlet for beverage preparation is determined in that
   the amount of water flowing through the cold water path is measured by the first flow meter, and
   i) the amount of water flowing through the at least one second hot water path is determined by the at least one second flow meter, and
   the amount of water flowing through the first hot water path is determined by calculating a difference between the amount of water flowing through the cold water path measured by the first flow meter and the amount of water flowing through the at least one second hot water path measured by the at least one second flow meter; or
   ii) the amounts of water flowing through the at least one second hot water path and flowing through further second hot water paths are measured by the at least one second flow meter and by further second flow meters, and
   the amount of water flowing through the first hot water path is determined by calculating a difference between the amount of water flowing through the cold water path measured by the first flow meter and the sum of the amounts of water flowing through the at least one second hot water path and flowing through the further second hot water paths measured by the at least one second flow meter and by the further second flow meters.

7. The method of claim 6, wherein, the at least one hot water amount is only one hot water amount that is used in the beverage maker for beverage preparation, said hot water amount flowing through a second hot water path, at least one of the flow meters is calibrated, with a measurement value for the amount of water flowing through the cold water path being measured by the first flow meter, a measurement value for the amount of water flowing through this second hot water path being measured by the flow meter arranged in said second hot water path through which the hot water amount flows, and the two measurement values are subsequently compared with one another.

8. A method of use of the beverage maker of claim 1, wherein the beverage maker of claim 1 is used for metering and/or dispensing beverages, wherein the method comprises metering and/or dispensing two or more beverages simultaneously or with a time delay.

* * * * *